United States Patent [19]

Yan et al.

[11] Patent Number: 4,869,159
[45] Date of Patent: Sep. 26, 1989

[54] BUILT-UP AND TELESCOPIC TEA-MAKING DEVICE

[76] Inventors: Chung-Yi Yan; Jenn-Shuenn Yan, both of 71, Chung Cheng Rd., Chin Shui Chen, Taichung Hsien, Taiwan

[21] Appl. No.: 234,127
[22] Filed: Aug. 19, 1988
[51] Int. Cl.⁴ .............................................. A47J 31/00
[52] U.S. Cl. ...................................................... 99/323
[58] Field of Search ................. 99/279, 323, 316, 317, 99/318, 319, 321, 322, 297; 426/433

[56] References Cited

U.S. PATENT DOCUMENTS

| | | | |
|---|---|---|---|
| 1,387,128 | 8/1921 | Cowan | 99/323 |
| 1,388,636 | 8/1921 | Frautnick | 99/323 |
| 2,788,733 | 4/1957 | Jacques | 99/317 |
| 4,211,156 | 7/1980 | Zimmermann | 99/323 |

Primary Examiner—Robert W. Jenkins

[57] ABSTRACT

A tea-making device includes a cover plate covering a tea cup, an upper casing and a lower casing telescopically combinable with each other for filling tea leaves therein, a bolt neck mounted under a cap capped on the cover plate for slidably securing the upper casing so that the upper and lower casings may be extended for infusing tea in the tea cup or be retracted and concealed in the cover plate for separating tea leaves from the tea water.

5 Claims, 2 Drawing Sheets

BUILT-UP AND TELESCOPIC TEA-MAKING DEVICE

BACKGROUND OF THE INVENTION

When preparing tea, coffee, ginseng, etc. in a daily life, it requires a device for infusing such materials. For making tea, a conventional tea set may be used, which however may have the following drawbacks:

1. If tea-making is made by placing tea leaves in a tea cup for their infusion, the infused tea leaves may float on a water surface to influence the drinking of tea. The concentration of tea is difficultly controlled. After a long time infusion, an alkali may be dissociated from the tea, harmful for the user's health. It is therefore expected to separate the tea leaves from the liquid tea water.

2. If a tea bag is used for tea-making, the concentration of tea is still not controllable due to a fixed amount of tea packed in the tea bag. Meanwhile, the disposal of the infused tea bag may also cause contamination, such as the water drops drained from the infused tea bag.

The present inventors have found the drawbacks of a conventional tea-making means and invented the present built-up and telescopic tea-making device.

SUMMARY OF THE INVENTION

The object of the present invention is to provide a tea-making device including a cover plate covering a tea cup, an upper casing and a lower casing telescopically combinable with each other for filling tea leaves therein, a bolt neck mounted under a cap capped on the cover plate for slidably securing the upper casing so that the upper and lower casing may be extended for infusing tea in the tea cup or be retracted and concealed in the cover plate for separating tea leaves from the tea water.

DETAILED DESCRIPTION

This invention relates to a built-up and telescopic tea-making device and more particularly a tea-making device for suitably matching with a variety of containers and for fully infusing tea leaves which can be separated from tea water and attached to the cover plate after preparation of tea. It may provide heat-maintaining effect and is also simple to operate and convenient to carry.

Figure 1:
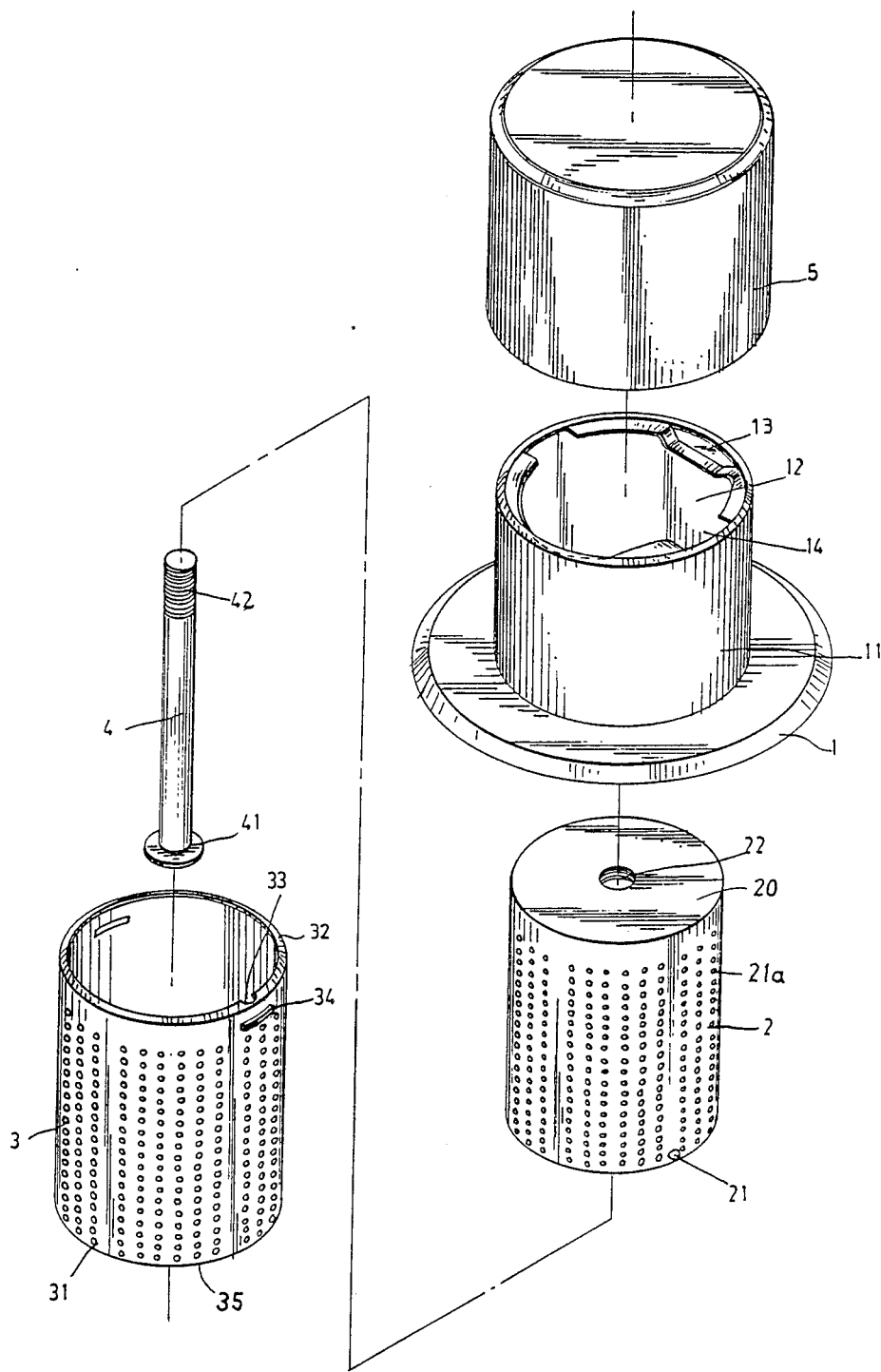
FIG. 1 is an illustration showing all elements of the present invention.
Figure 2:
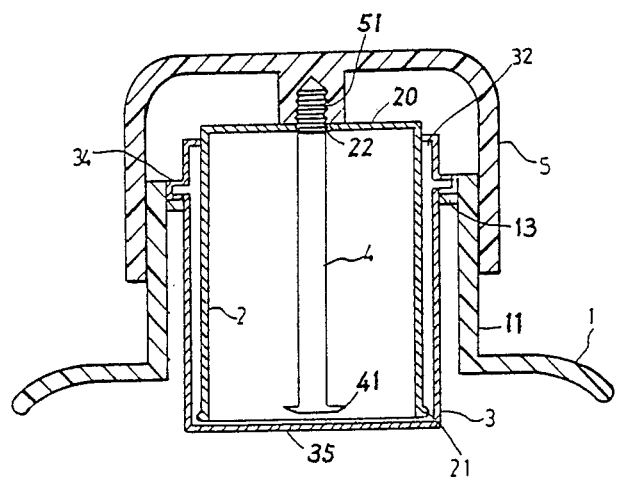
FIG. 2 is a sectional drawing of the present invention when collapsed.

As shown in FIG. 1, the tea-making device 30 of the present invention comprises: a cover plate 1, an upper casing 2, a lower casing 3, a bolt neck 4, and a cap 5. After assembling the elements of the present invention, it provides a telescopic effect to match with different shapes of cups. After infusion of tea, the tea leaves are simply separated from tea water. The present invention may also match with different cups or containers according to practical requirements for versatile uses.

The present invention will be further described with reference to the accompanying drawings, in which:

1. The upper and lower casings 2, 3 are each formed as a hollow cylindrical shape with plurality of small holes 21a, 31 formed through a periphery of each casing 2 or 3. The lower casing 3 has a bore portion with its top opening contacted to form a flange 32 of a L-shaped longitudinal section and has a bottom plate 35 opposite to the top opening. The flange 32 has a central opening small than an inner diameter of the lower casing 3 but is slightly larger then an outer diameter of the upper casing 2. The flange 32 is recessed to form a casing slot 33 and two protruding portions 34 are formed on an upper periphery of the lower casing 3 adjacent to the flange 32.

2. The upper casing 2 includes two convex portions 21 formed on a lower periphery adjacent to a lower opening of the upper casing 2. The two convex portions 21 are insertable through the slot 33 of the lower casing 3 to allow the upper casing 2 to be telescopically connected with the lower casing 3. An upper disk 20 of the upper casing 2 is formed with a through hole 22 for freely inserting the bolt neck 4 therethrough so that the cap 5 is connected with the bolt neck 4. The bolt neck 4 has its upper end formed with male-threaded portion 42 engageable with a female-threaded socket 51 formed in the cap 5 and has its lower end formed with a nut 41 for slidably securing the upper casing 2 on the bolt neck 4 as movably limited between the nut 41 and the cap 5. The lower casing 3, the upper casing 2 and the bolt neck 4 are assembled to be a telescopic unit having three sections.

3. The diameter of the cover plate 1 is larger than that of either the upper casing 2, the lower casing 3 or the cap 5 to fit with regular tea cups and is hot limited to only one size of a tea cup. A central protruding portion 11 of the cover plate 1 is formed a cylindrical hole 12 having its top opening contracted to from a pair of lugs 13 each lug having a L-shaped longitudinal section. Two slots 14 are formed in an upper perimeter of the central protruding portion 11. Each slot 14 is recessed from each lug 13 as shown in FIG. 1 and is engageable with the protruding portion 34 of the lower casing 3 so that the protruding portions 34 of the lower casing 3 may pass through the slots 14 for tea-making purpose. After preparation ( infusion ) of tea, the cap 5 with the neck 4, casings 2, 3 is lifted and rotated to overlie the protruding portions 34 of the casing 3 on the lugs 13 after upwardly passing the slots 14, the lower casing 3, the upper casing 2 and the bolt neck 4 are concealed in the central protruding portion 11 of the cover plate 1 to minimize the space and simply separate the tea leaves from the tea water.

4. The diameter of the cap 5 is larger than the central protruding portion 11 of the cover plate 1 such that the cap 5 is always capped on the cover plate 1. The cap 5 can also be connected with the central protruding portion 11 by means of screw joint or other connecting measures.

Figure 3:
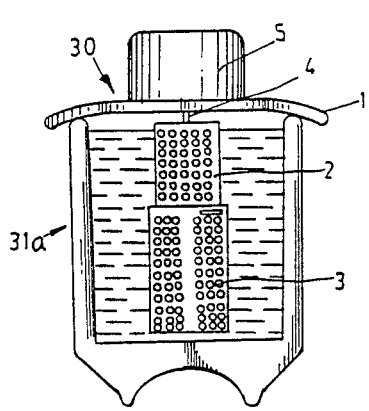
FIG. 3 is an illustration of the present invention when telescopically extended.
Figure 4:
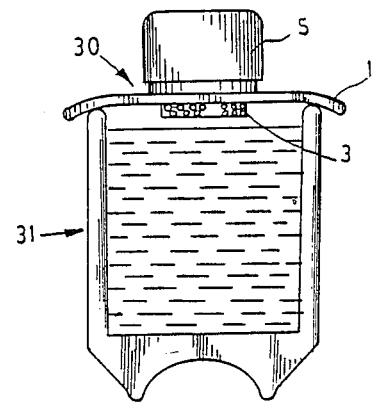
FIG. 4 is an illustration of the present invention when upwardly retracting the casings above the tea water level.

As shown in FIGS. 3 and 4, the upper and lower casings are connected and the tea leaves are put into the lower casing 3. The tea-making device 30 is then mounted on a cup 31a to extend the two casings 2, 3 to sink the lower casing 3 to the cup bottom so as to fully infuse the tea. The water filled into the cup may be adjusted with respect to the quantity of tea leaves added. After infusion of tea, the cap 5 is lifted to also raise the bolt neck 4, the upper casing 2 (due to an engagement of nut 41 with an upper disk 20 of the upper casing 2) and the lower casing 3 (due to an engagement of convex portions 21 with the flange 32). The tea-making device 30 is withdrawn from the central protruding portion 11 of the cover plate 11 by passing each protruding portion 34 of the lower casing 3 from slot 14. Then the cap 5 of the tea-making device 30 is rotated to overlie the protruding portions 34 of the lower casing 3 on the lugs 13 of the central protruding portion 11 of the cover plate 1 and the cap 5 is then lowered to retract the lower casing 3 in the central protruding portion 11. The cap 5 is lowered to further retract the upper casing 2 in the lower casing 3 and to retract the bolt neck 4 in the upper casing 2 to conceal the casings 2, 3 in the central protruding portion 11 as shown in FIG. 4. By this way, the problems, such as: excessive infusion, inconvenient drinking, water dropping and contamination will then be overcome.

The present invention has the following advantages in comparison with a conventional tea-making device:

1. By such a telescopic mechanism, the tea leaves can be thoroughly infused. It provides wide range of applicability to match with caps of different sizes.

2. During the preparation of tea, the cover plate and the casings are stably mounted on a cup. After preparation of tea, the tea leaves with the tea-making device is easily separated from the prepared tea water for drinking convenience. The tea-making device is still attached to the cup to form a compact unit for keeping warm of the tea water and for preventing water dropping or contamination thereof.

3. The elements of the present invention are easily assembled, packed and operated.

We claim:

1. A built-up and telescopic tea-making device comprising: a cover plate, and upper casing, a lower casing, a bolt neck and a cap; said upper and lower casings each formed as a hollow cylindrical configuration with plurality of small holes formed through a periphery of each said casing, said bolt neck being inserted into the upper casing to connect said cap; said upper casing, having an upper disk and a lower opening opposite to said upper disk, slidably secured to said bolt neck fixed under said cap; said lower casing, having a bottom plate and an upper opening opposite to said bottom plate, operatively concealed in a central protruding portion of said cover plate; said upper casing telescopically engageable in a bore portion of said lower casing and combinable with said lower casing for filling tea leaves therein; said tea-making device having said cover plate capped with said cap operatively mounted on a tea cup for preparation or infusion of tea, said tea-making device being applicable to a variety of said tea cups having different sizes.

2. A built-up and telescopic tea-making device according to claim 1, wherein said bolt neck is inserted into a through hole formed in said upper disk of said upper casing, having an upper end portion of said bolt neck connected with said cap by a screw joint and having a nut formed on a lower end thereof so that said upper casing is slidably movably limited between said cap and said nut.

3. A built-up and telescopic team-making device according to claim 1, wherein said upper casing is formed with two convex portions on a lower periphery of said upper casing, said lower casing having a top opening contracted to form a flange to L-shaped longitudinal section, said flange having a central opening smaller than an inner diameter of said lower casing and slightly larger than an outer diameter of said upper casing to telescopically receive the upper casing in said lower casing, the flange of said lower casing recessed to form a casing slot for subsequently inserting the two convex portions of the upper casing therethrough for assembling the two said casing for making tea.

4. A built-up and telescopic tea-making device according to claim 1, wherein said cover plate is formed with a cylindrical hole in a central protruding portion of said cover plate, having a top opening of said central protruding portion contracted to form a pair of lugs each lug having a L-shaped longitudinal section, and having a pair of slots each slot adjacent to each said lug for freely passing a pair of protruding portions formed on an upper periphery of said lower casing, said two protruding portions of said lower casing operatively overlain on said two lugs for concealing said lower casing in said central protruding portion of said cover plate.

5. A built-up and telescopic tea-making device according to claim 1, wherein said central protruding portion of said cover plate is further connected with said cap by a connecting means.

* * * * *